United States Patent

[11] 3,575,098

| [72] | Inventor | Richard B. Jones |
| | | 7035 Palm Ave., Highland, Calif. 92346 |
| [21] | Appl. No. | 752,887 |
| [22] | Filed | Aug. 15, 1968 |
| [45] | Patented | Apr. 13, 1971 |

[54] ADJUSTABLE CAMERA BRACKET
10 Claims, 13 Drawing Figs.

[52] U.S. Cl. .................................................... 95/86,
240/1.3, 240/2
[51] Int. Cl. ....................................................G03b, 17/56
G03b 15/03
[50] Field of Search........................................... 95/86;
240/2 (C), 1.3

[56] References Cited
UNITED STATES PATENTS

| 2,824,503 | 2/1958 | Weiss............................ | 95/86 |
| 2,976,791 | 3/1961 | Larsson......................... | 95/86 |
| 3,075,069 | 1/1963 | Spadaro......................... | 95/86X |
| 3,176,602 | 4/1965 | Wilt................................ | 95/86 |
| 3,263,588 | 8/1966 | Robinson....................... | 95/86 |
| 3,289,563 | 12/1966 | Kent.............................. | 95/86 |
| 3,356,325 | 12/1967 | Schnase........................ | 95/86X |

FOREIGN PATENTS

| 1,123,172 | 6/1956 | France.......................... | 95/86 |

Primary Examiner—Samuel S. Matthews
Assistant Examiner—Kenneth C. Hutchison
Attorney—Dana E. Keech ABSTRACT: A flat normally horizontal, rectangular camera mounting base is supported manually by a single handle connected at its lower end to the outer end of a leftward extension of the base near the front end of the left edge of said base, said handle normally extending upright but being pivotally adjustable forwardly relative to said extension about a transverse horizontal axis. A flash unit supporting arm extends upwardly from the upper end of the handle at a slight inclination relative thereto to within a short distance of a vertical plane containing the optical axis of a camera mounted on said base. A short horizontal extension extends inwardly from the upper end of said arm, said extension being normal to said vertical plane and bisected thereby. A flash unit mounting screw is provided in said plane on said arm extension and secures to said extension a flasher unit support which is rockable about a horizontal axis normal to said plane.

A right-angled adapter bracket is optionally mountable on the base and pivotally supports an elevated right-angled auxiliary camera supporting platform whereby the latter with the camera fixed thereto may be rotated about the focal axis of the camera to any desired angle while taking a picture. To facilitate rapid assembly or disassembly on the camera mounting base of a camera or of the angular adapter bracket, an adapter slug is screwable onto each of the latter and is quickly engageable or disengageable by a novel spring biased clamp on the mounting base.

The base of the device has downwardly extending edgewalls which, together with the lateral extension from the base for supporting the handle of the device, engage a flat surface on which the device is placed so as to support the device with the handle in upright position when placed on a table.

Patented April 13, 1971
3,575,098
2 Sheets-Sheet 1
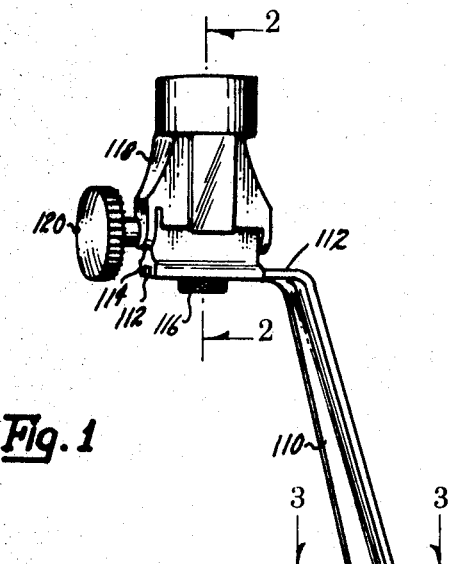
Fig. 1
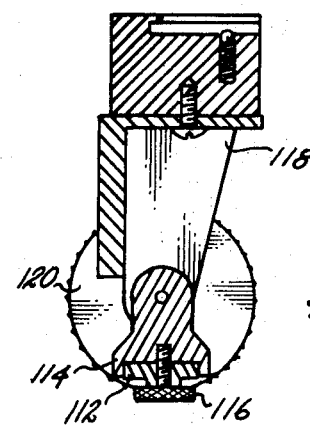
Fig. 2
Fig. 3
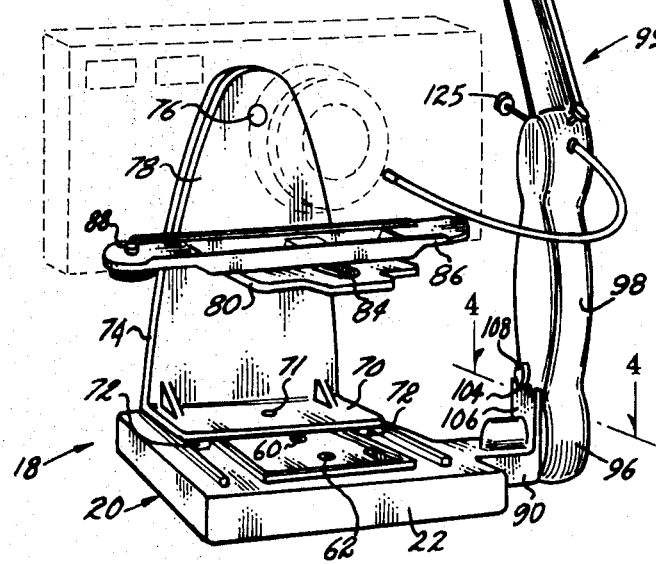
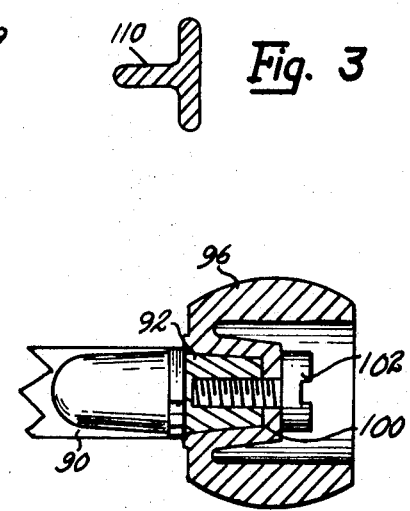
Fig. 4
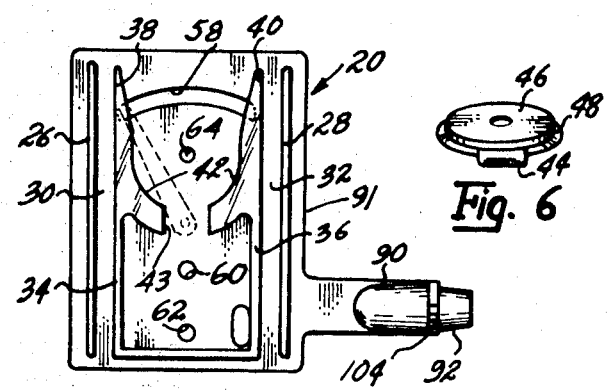
Fig. 5
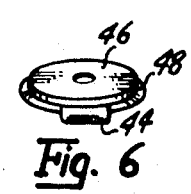
Fig. 6
Fig. 7
INVENTOR.
RICHARD B. JONES
BY
LIONEL V TEFFT
Attorney

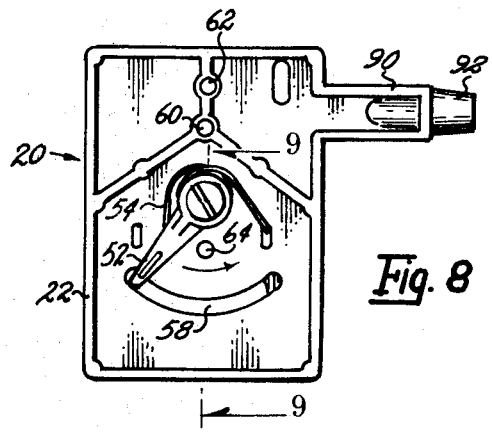
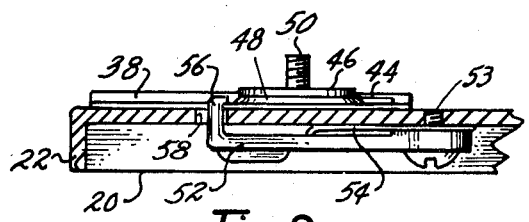
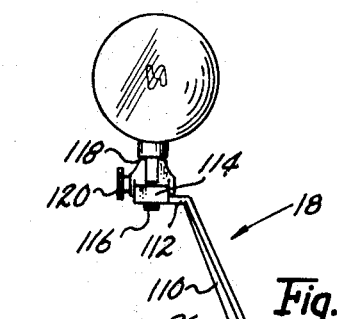
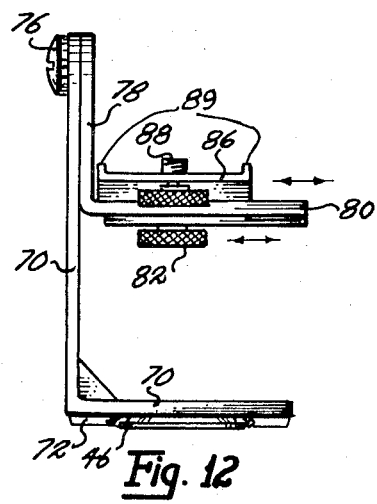
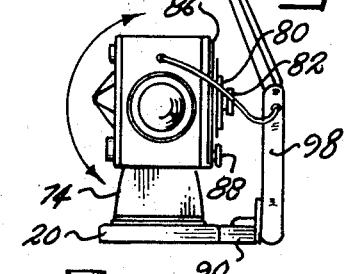
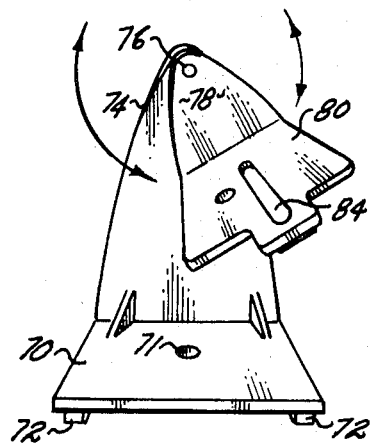

ADJUSTABLE CAMERA BRACKET

One of the objects of the invention is to provide a special type of camera base and flashlight bracket so that the structure is adjustable for use with different kinds of cameras, always maintains an easy sidearm holding position, and has the overhead flashlight support directly over the camera lens and bisected by a vertical plane containing the optical axis of the camera.

There are and have been various types of camera supports and flashlight brackets but they are either cumbersome, useful with a single kind of camera, or provide a poor overhead flash bulb position. The prior art structures and commercial devices do not support various makes of cameras in nonuse, seated position so they can be grasped easily and raised quickly to useful position with the overhead flash mechanism in proper position. Actually, there are no camera base and bracket support and overhead flash means on the market today that have any real flexibility of use that appeals to the expert.

Other objects of the invention lie in the provision of easily attachable camera holding and flash adjusting mechanism that makes the structure useful in different ways.

Another object of a broad nature lies in the provision of a quickly attachable and demountable camera base mechanism with a forwardly adjustable and well elevated flash means located at all times in the vertical plane of the optical axis of the camera.

These and other objects and advantages of the present invention will become apparent to those skilled in the art upon consideration of the following detailed description of the preferred embodiment thereof, reference being made to the accompanying drawings, herewith wherein:

FIG. 1 is a perspective view of the bracket with the camera and flash unit adapters in position of use and showing in broken lines a moving picture camera mounted on the camera adapter.

FIG. 2 is an enlarged sectional view taken on the line 2-2 of FIG. 1;

FIG. 3 is an enlarged sectional view taken on the line 3-3 of FIG. 1;

FIG. 4 is an enlarged sectional view taken on the line 4-4 of FIG. 1;

FIG. 5 is a plan view of the bracket base with the camera adapter and supporting handle removed;

FIG. 6 is a perspective view of the camera attaching slug;

FIG. 7 is a cross-sectional view of FIG. 6;

FIG. 8 is a bottom view of the bracket base;

FIG. 9 is an enlarged sectional view taken on the line 9-9 of FIG. 8;

FIG. 10 is a front elevational view of the bracket with a 35 mm. camera attached to the rotatable adapter bracket;

FIG. 11 is a side elevational view of the bracket with a twin lens camera attached directly to the base;

FIG. 12 is an enlarged elevational view of the complete camera adapter bracket; and FIG. 13 is a perspective view of the camera adapter bracket showing the manner in which the camera attachment member rotates.

Referring to the drawings for a disclosure of a preferred embodiment 18 of the invention, it is deemed best to consider first the camera supporting base and the camera holding handle and the bracket rising therefrom. A substantially rectangular hollow base 20 22 has edge walls which enclose, but also provide easy access from beneath to the mechanism contained therein. The base 20 is, as shown, set back from the support for the holding bracket so that a camera attached thereto is always held backwardly from directly beneath the flashlight means. The base 20 is also located to the right of the holding bracket making it convenient to support the bracket in the left hand leaving the right hand free to manipulate the camera and flasher unit controls.

The base 20 is adapted to demountably support, directly on the base, a twin lens camera 24 as shown in FIG. 11. Reference should now be made to FIGS. 5, 8 and 9. FIG. 5 shows a plan view of the base, FIG. 8 shows a bottom view thereof and FIG. 9 is a sectional view of FIG. 8. The top of the base 20 is ribbed at 26 and 28 to form slotted guideways 30 and 32, respectively with inner ribs 34 and 36, respectively. The rear inner edges 38 and 40, respectively, of the ribs 34 and 36 are gradually tapered and undercut to form a curved opening 42 with undercut edges and slotted at 43 to receive a similar shaped lug 44 on a slug 46 having curved tapered cam sides 48. The slug 46, as shown in FIG. 9, has a threaded screw 50 passing centrally therethrough and connectable with the bottom of any twin lens camera in conventional manner.

The slug 46 is provided for quick camera attachment to the base 20. An attaching pivoted lever 52 pivoted on a screw 53, is spring tensioned at 54 to cause this lever to be biased towards its position as shown in FIG. 8. This lever has an inwardly notched cam lock 56 at its free end, said lock extending through an arcuate slot 58 in the base 20 for quick release, engaging the tapered cam side 48 to clamp the camera attaching slug 46 against the undercut curved inner edges of opening 42 with lug 44 extending into slot 43. Quick attachment of a twin lens camera may also be accomplished in a modified manner. As a matter of fact, the twin lens camera 24 can be adjustably connected to the base 20 by screwing the screw 50 through spaced taped apertures 60, 62 and 64 in the base for direct connection with the standard twin lens camera. These apertures could also be used for tripod mounting.

The attachment slug 46 makes easy the quick mounting and demounting of a right-angled bracket base 70 that is apertured at 71 and tapped to receive the screw 50 of the slug 46. The bracket base 70 is dual ribbed on its lower side at 72 to ride securely in the grooves or guides 30 and 32 on the face of the base 20. It is apparent that the bracket base 70 having an upstanding backplate 74 is thus quickly attachable to and detachable from the base 20. In FIG. 12, the slug 46 is shown secured to the bracket base 70.

In this instance, a different type of camera, namely 35 mm., is to be mounted on the base for rotation about its optical axis in a manner to be described later. The tapered upper end of the backplate 74 is pivotally connected at 76 to a right-angled camera supporting bracket including a vertical element 78 and a horizontal camera support 80, (as shown in FIG. 13). A conventional 35 mm. camera may be attached to the support 80 by means of a screw 82 passing through an adjustment slot 84 so that the screw 82 may be positioned forwardly or rearwardly as desired in securing cameras of various sizes to support 80 with the back of the camera against vertical element 78. The camera may be moved from horizontal to vertical position or any angle about pivot 76 by merely rotating the pivotally mounted base 80 about said pivot which is approximately concentric with the optical axis of all cameras of this specific type when mounted on support 80.

There is still another optional camera mounting in that a special support 86, FIGS. 1 and 12, may also be connected by screw 82 to the adjustment slot 84 and then in turn be screw connected by a screw 88 to a foreign camera such as a Leica. The Leica may be pivoted in the manner heretofore described. The support 86 is designed with ribs 89 which engage and hold the camera against rotating about screw 88 and the camera is supported by support 86 with the optical axis thereof approximately concentric with pivot 76.

Briefly we may say that a twin lens camera has quick detachable and adjustable mounting in the stable base 20. By using the pivoted type mounting bracket base 70, a 35 m.m. camera can be quickly attached for various positions of use. Also a Leica may be specially attached to base 70 for satisfactory use.

We now turn to the side forwardly disposed camera holding bracket with its overhead flashlight support. A horizontal lateral extension 90 from a forward portion of left side edge 91 of the base 20 has a tapered attaching plug 92 formed as a part thereof and extending laterally on a horizontal axis in the manner shown in FIGS. 1, 4 and 5. A hub 96 on the handle grip 98 of a side bracket 99 conforms at 100 to the tapered plug 92 and is demountably and securely attached thereto by means of a setscrew 102. This connection could be otherwise made but it is desired that the handle 98 be given a multiple of positively fixed optional forward adjusting positions by means of indents 104 on an upstanding portion 106 on the extension 90 and a lug 108 on the handle grip 98. To adjust the side bracket 99 forwardly or rearwardly, the handle grip 98 is first loosened, set in the desired position and then set in this position by tightening the setscrew 102. The slot in this screw is purposely made wide enough to receive any small coin thereby making a screwdriver unnecessary for effecting such an adjustment.

The camera side bracket grip and support 99 has an upwardly and inwardly angled arm 110 with a short horizontal inward extension of which is normal to a vertical plane containing the optical axis of a camera mounted on the base 20 and is bisected by said plane. A member 114 is grooved to fit on the arm extension 112 and is secured thereto by a screw 116. A flashlight unit support 118 is pivotally mounted on the member 114 under the control of a locking screw 120. It is to be noted that the edge walls 22 of base 20 extend downward below the lever 52 mounted on the bottom of the base 20 and into contact with the table on which the entire bracket 11 may be placed. The leftward extension 90 of said base also engages said table. The inward inclination of arm 110 and its upper extension 112 over the base 20 thus results in the bracket 18 standing upright on said table supported by said edge walls 22 and said extension 90.

As far as the operation of the apparatus is concerned, the various adjustments are believed clearly shown and described. The matter of flexibility of the structure is highly important. The device provides an excellent support for any type of camera so that it can be seated securely, picked up easily and always held in position with the flash mechanism above and adjustably forward of the camera lens. Attachability and removability of the parts is relatively simple and quickly performed. The flexibility of this overall bracket support for various cameras renders it entirely different from anything heretofore known. Camera actuating means 125 for the camera from the handle grip may be provided as shown in FIG. 1 or otherwise.

I claim:

1. A single-hand-supported camera and flashlight bracket comprising:
    a rectangular normally horizontal camera mounting base having a side edge;
    means for readily mounting a camera on said base with its optical axis in a vertical plane parallel with said side edge;
    a handle-mounting extension formed integrally with said base and extending laterally from said side edge of said base near the front end of said edge;
    a relatively bulky handle shaped for gripping with a single hand, said handle extending upwardly from the outer end of said extension so that the hand gripping said handle is located just above said extension and said handle terminates just above said hand;
    a relatively light straight arm formed integrally with the upper end of said handle and extending upwardly and inwardly at a slight inclination relative to said handle to a point close to said vertical plane;
    a short inward extension formed from the upper end of said arm, said extension being normal to said plane and bisected thereby; and
    means for readily mounting a flash unit on said arm extension with said unit symmetrical with said vertical plane.

2. A bracket as recited in claim 1 wherein the bottom surfaces of said base and said lateral base extension lie in a common plane below said camera mounting means provided on said base whereby said surfaces provide a balanced support for said bracket with said handle and arm extending uprightly and without any camera being attached to said base.

3. A bracket as recited in claim 1 wherein said handle is adjustably rotatable on said base extension about an axis normal to said plane.

4. A bracket as recited in claim 3 wherein said flash unit mounting means is adjustably rotatable about an axis normal to said plane.

5. A bracket as recited in claim 3 wherein:
    a tapered plug is provided on said base extension;
    a taper-bored hub fitting said plug is provided on the lower end of said handle; and
    a screw is provided on said first mentioned pivotal axis which is adapted, when tightened, to adjustably lock said hub in any desired rotational position on said plug.

6. A bracket as recited in claim 5 wherein:
    notch means is provided on said base extension; and
    lug means is provided on said hub which is engageable selectively with said notch means to positively lock said handle in one or the other of certain generally used angular positions of said handle relative to said base.

7. A bracket as recited in claim 1 wherein:
    said base is provided with parallel pairs of ribs symmetrically spaced from and parallel with said vertical plane for positioning a camera resting on said base and having means extending between said pairs of ribs so that the optical axis of said camera lies in said vertical plane; and
    means for securing said camera to said base when so positioned.

8. A bracket as recited in claim 7 wherein:
    an approximately circular slug is provided having central screw means for attaching to a camera or adapter bracket, said slug having tapered cam sides and a lug extending radially in a given direction from said slug;
    converging portions of the innermost of said ribs having curved undercut edges terminating in a slot for receiving said lug when said slug is slid horizontally over said base to trap said sides under said curved undercut rib edges; and
    locking means on said base for engaging the tapered side of said slug from behind to trap said slug positioned as aforesaid on said base.

9. A bracket as recited in claim 8 wherein said locking means comprise:
    a lever pivotally mounted on the bottom of said base forwardly of the center of said slug when the latter is so positioned on said base and spring biased toward one side of said base;
    an arcuate slot in said base concentric with the pivot of said lever and located near the end of the latter; and
    a notched locking finger extending upwardly from the end of said lever through said slot so that when said lever is swung away from the direction in which it is biased to admit said slug into its position in locked relation with said curved undercut rib edges, and said lever is released, said notched finger will be biased into locking relation with the tapered side of said slug from behind to trap said slug in said position.

10. A bracket as recited in claim 1 including an auxiliary camera mount including a bottom plate which is ribbed on its lower surface for interengagement with the ribs provided on said bracket base, said plate having a vertical backplate on which is pivotally mounted a right-angled camera support including a vertical element and a horizontal element, the latter including means for readily mounting a camera thereon with the optical axis of the camera approximately concentric with the pivotal connection between said support and said backplate and with said optical axis approximately lying in said aforementioned vertical plane, whereby said camera may be supported by said support in any selected rotational position about its pivotal axis and without removing said optical axis of said camera from said vertical plane.